US011492524B2

(12) United States Patent
Wilker et al.

(10) Patent No.: US 11,492,524 B2
(45) Date of Patent: Nov. 8, 2022

(54) ADHESIVES AND METHODS OF MAKING THE SAME

(71) Applicant: Purdue Research Foundation, West Lafayette, IN (US)

(72) Inventors: Jonathan James Wilker, Lafayette, IN (US); Heather Meredith Chaput, Beavercreek, OH (US)

(73) Assignee: Purdue Research Foundation, West Lafayette, IN (US)

( * ) Notice: Subject to any disclaimer, the term of this patent is extended or adjusted under 35 U.S.C. 154(b) by 42 days.

(21) Appl. No.: 17/338,237

(22) Filed: Jun. 3, 2021

(65) Prior Publication Data

US 2021/0292613 A1    Sep. 23, 2021

Related U.S. Application Data

(62) Division of application No. 16/677,867, filed on Nov. 8, 2019, now Pat. No. 11,060,004, which is a division of application No. 15/737,893, filed as application No. PCT/US2016/040052 on Jun. 29, 2016, now Pat. No. 10,513,641.

(Continued)

(51) Int. Cl.
| | |
|---|---|
| *C09J 133/26* | (2006.01) |
| *C09J 133/12* | (2006.01) |
| *C08F 12/24* | (2006.01) |
| *C09J 133/08* | (2006.01) |
| *C09J 125/18* | (2006.01) |
| *C09J 133/10* | (2006.01) |
| *C08F 220/28* | (2006.01) |
| *C08F 120/14* | (2006.01) |
| *C08F 220/14* | (2006.01) |
| *C09J 133/14* | (2006.01) |
| *C08F 220/60* | (2006.01) |

(52) U.S. Cl.
CPC ............ *C09J 133/26* (2013.01); *C08F 12/24* (2013.01); *C08F 120/14* (2013.01); *C08F 220/14* (2013.01); *C08F 220/286* (2020.02); *C09J 125/18* (2013.01); *C09J 133/08* (2013.01); *C09J 133/10* (2013.01); *C09J 133/12* (2013.01); *C09J 133/14* (2013.01); *C08F 220/603* (2020.02); *C08F 2800/10* (2013.01)

(58) Field of Classification Search
CPC ...... C09J 133/26; C09J 133/14; C09J 133/12; C08F 220/60; C08F 220/28; C08F 220/14; C08F 120/14; C08F 2800/10; C08F 2220/603; C08F 2220/286; C08F 12/24
See application file for complete search history.

(56) References Cited

U.S. PATENT DOCUMENTS 5,350,798 A * 9/1994 Linden .................. C08K 5/103
525/41

* cited by examiner

*Primary Examiner* — Shane Fang
(74) *Attorney, Agent, or Firm* — Dentons Bingham Greenebaum LLP; Brian W. Chellgren; John V. Daniluck (57) ABSTRACT

Embodiments of this invention relate to adhesives, and more particularly to biomimetic heteropolymer adhesive compositions. Certain embodiments relate to biomimetic terpolymer adhesive compositions including dopamine methacrylamide, 3,4-dihydroxyphenylalanine, or 3,4-dihydroxystyrene, mimicking moieties found in marine mussel adhesive proteins. In some embodiments, elastic moduli of the adhesives are preferably selected to match the elastic moduli of the substrates to minimize stress concentrations, to increase the ductility of the adhesive-substrate system, or both.

7 Claims, 9 Drawing Sheets

Related U.S. Application Data

(60) Provisional application No. 62/186,369, filed on Jun. 30, 2015.

ADHESIVES AND METHODS OF MAKING THE SAME

This application is a divisional of U.S. patent application Ser. No. 16/677,867, filed Nov. 8, 2019, for ADHESIVES AND METHODS OF MAKING THE SAME, which is a divisional of U.S. patent application Ser. No. 15/737,893, filed Dec. 19, 2017, for ADHESIVES AND METHODS OF MAKING THE SAME, which claims priority under 35 U.S.C. § 371 to international patent application no. PCT/US2016/040052, filed Jun. 29, 2016, for ADHESIVES AND METHODS OF MAKING THE SAME, which claims the benefit of U.S. provisional patent application Ser. No. 62/186,369, filed Jun. 30, 2015, for ADHESIVES AND METHODS OF MAKING THE SAME, all of which are incorporated herein by reference.

GOVERNMENT RIGHTS

This invention was made with government support under Grant No. N000141310327, awarded by the Office of Naval Research. The government has certain rights in the invention.

FIELD OF THE INVENTION

Embodiments of this invention relate to adhesives, and more particularly to biomimetic heteropolymer adhesive compositions. Certain embodiments relate to biomimetic terpolymer adhesive compositions including dopamine methacrylamide, 3,4-dihydroxyphenylalanine, or 3,4-dihydroxystyrene, mimicking moieties found in marine mussel adhesive proteins. In some embodiments, elastic moduli of the adhesives are preferably selected to match the elastic moduli of the substrates to minimize stress concentrations, to increase the ductility of the adhesive-substrate system, or both.

BACKGROUND

Adhesives with different chemistries and varying forms have found widespread use in the automotive, aerospace, construction, and biomedical industries. The polymers most often used in adhesives are epoxy, polyurethane, or acrylics. Due to the wide range of uses of adhesives, optimal bonding is needed for a variety of substrates, joint geometries, and applications. When designing an adhesive, the elastic modulus (i.e., stiffness) of both the glue and the substrates being joined must be considered. If the elastic modulus of these materials differs and the joint is subjected to mechanical load, the mismatch in stiffness generates interfacial stresses that can bring about bond failure. There exists a need for adhesives suitable for joining substrates of varying stiffness.

SUMMARY

High performance adhesives require mechanical properties tuned to demands of the surroundings. A mismatch in stiffness between substrate and adhesive leads to stress concentrations and fracture when the bonding is subjected to mechanical load. Balancing material strength versus ductility, as well as considering the relationship between adhesive elastic modulus and substrate elastic modulus, will create stronger joints. Mechanical properties of biomimetic heteropolymer adhesives are tailored by controlling the amount of stiffening monomers and softening monomers added to a cross-linking monomer in the heteropolymer. In some embodiments, elastic moduli of the adhesives are preferably selected to match the elastic moduli of the substrates to minimize stress concentrations, to increase the ductility of the adhesive-substrate system, or both.

In some embodiments, an adhesive composition comprises a heteropolymer including one of dopamine methacrylamide or 3,4-dihydroxyphenylalanine or 3,4-dihydroxystyrene, and at least one of methyl methacrylate, styrene, and poly(ethylene glycol) methyl ether methacrylate.

In some embodiments, an adhesive composition comprises a heteropolymer including a plurality of monomers including a dopamine moiety and a plurality of monomers including an acrylate moiety.

In some embodiments, a biomimetic polymer adhesive comprises the following components: cross-linking monomer in a proportion of about 28% to about 36% by mole percentage, stiffening monomer in a proportion of 0% to about 65% by mole percentage, and softening monomer in a proportion of about 0% to about 72% by mole percentage.

In some embodiments, a method of adhering comprises selecting a pair of substrates to be adhered, determining an elastic modulus of each substrate, and adhering the substrates using a heteropolymer adhesive including a plurality of cross-linking monomers and a plurality of stiffening monomers, wherein, if the elastic modulus of each of the substrates is greater than about 1 GPa, the heteropolymer adhesive further includes a plurality of softening monomers.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein is not necessarily intended to address every object described herein, and each embodiment does not necessarily include each feature described. Other forms, embodiments, objects, advantages, benefits, features, and aspects of the present invention will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF DRAWINGS

FIG. 4B is a graph depicting butt tensile adhesion of heteropolymer adhesives to different substrates with varying stiffness. The heteropolymer adhesives contain approximately 33 mole percent dopamine methacrylamide and varying percentages of methyl methacrylate versus poly(ethylene glycol) methyl ether methacrylate. The compositions of each heteropolymer are listed in Table 2. The Y-axis indicates the adhesion strength measured in megapascals. The X-axis indicates the mole percent poly(ethylene glycol) methyl ether methacrylate in the heteropolymer. The substrates are Shore hardness 40A polyurethane (line with black squares), Shore hardness 80A polyurethane (line with open squares), Shore hardness 75D polyurethane (line with grey triangles), poly(vinyl chloride) (PVC) (line with grey circles), and poly(methyl methacrylate) (PMMA) (line with open circles).

DETAILED DESCRIPTION OF THE PREFERRED EMBODIMENTS

For the purposes of promoting an understanding of the principles of the invention, reference will now be made to selected embodiments illustrated in the drawings and specific language will be used to describe the same. It will nevertheless be understood that no limitation of the scope of the invention is thereby intended; any alterations and further modifications of the described or illustrated embodiments, and any further applications of the principles of the invention as illustrated herein are contemplated as would normally occur to one skilled in the art to which the invention relates. At least one embodiment of the invention is shown in great detail, although it will be apparent to those skilled in the relevant art that some features or some combinations of features may not be shown for the sake of clarity.

Any reference to "invention" within this document herein is a reference to an embodiment of a family of inventions, with no single embodiment including features that are necessarily included in all embodiments, unless otherwise stated. Further, although there may be references to "advantages" provided by some embodiments of the present invention, it is understood that other embodiments may not include those same advantages, or may include different advantages. Any advantages described herein are not to be construed as limiting to any of the claims.

Specific quantities (spatial dimensions, angles, dimensionless parameters, etc.) may be used explicitly or implicitly herein, such specific quantities are presented as examples and are approximate values unless otherwise indicated. Discussions pertaining to specific compositions of matter are presented as examples and do not limit the applicability of other compositions of matter, especially other compositions of matter with similar properties, unless otherwise indicated.

Figure 1A:
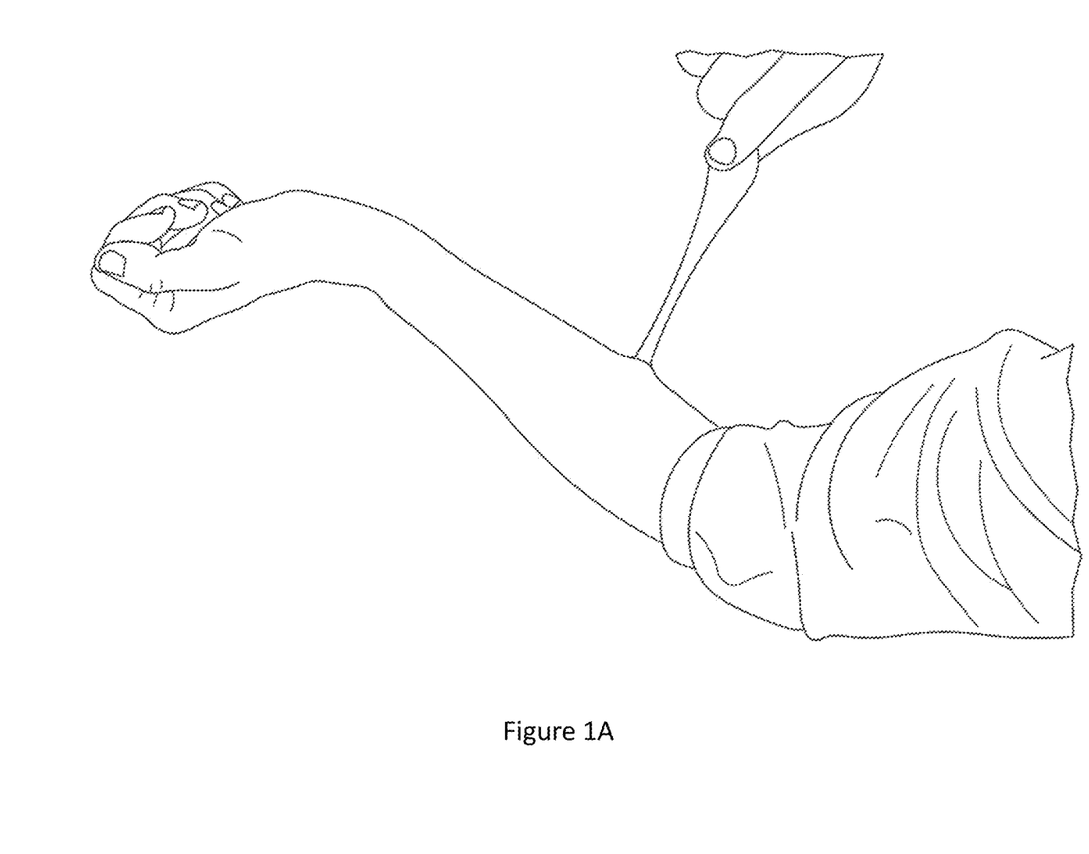
FIG. 1A is an image displaying flexible substrates, namely, human skin, joined by an adhesive.
Figure 1B:
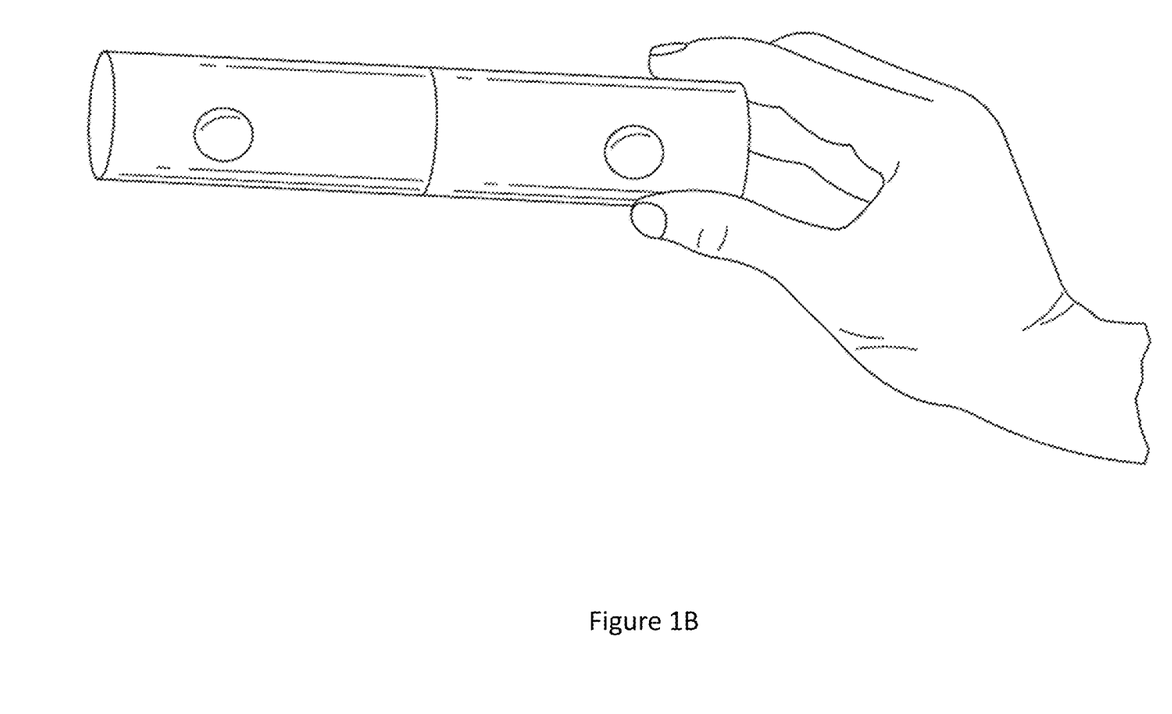
FIG. 1B is an image displaying stiff substrates, namely, metal cylinders, joined by an adhesive.
Figure 1C:
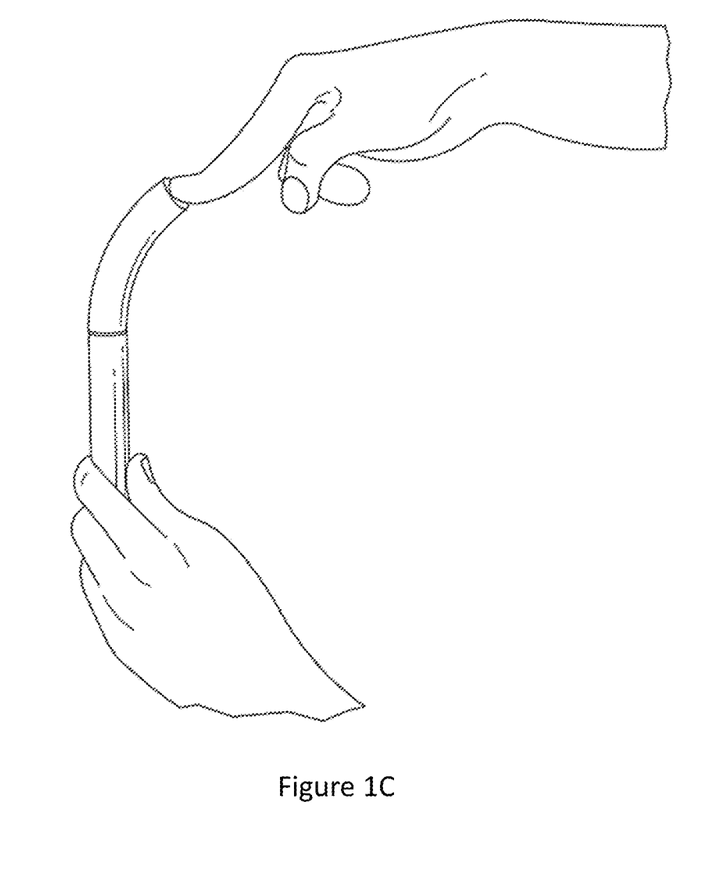
FIG. 1C is an image displaying a flexible substrate, namely, a polyurethane cylinder, joined by an adhesive to a stiff substrate, namely, a metal cylinder.

When designing an adhesive, the elastic modulus (i.e., stiffness) of both the glue and the substrates being joined must be considered. If the elastic modulus of these materials differs and the joint is subjected to mechanical load, the mismatch in stiffness generates interfacial stresses that can bring about bond failure. FIGS. 1A, 1B and 1C are photographs displaying adhesives used to join substrates of varying stiffness. In order to maintain bond integrity, a lower modulus adhesive should be used for bonding flexible substrates such as rubber or skin (FIG. 1A). A high modulus adhesive is preferred for stiff substrates including metal and hard bone (FIG. 1B). This materials design consideration becomes more problematic when adhering dissimilar substrates of varying stiffness (FIG. 1C). The moduli of the adhesives should be chosen to match the moduli of the substrates in order to minimize stress concentrations.

Several analytical models have shown that as the adhesive modulus becomes increasingly different from the modulus of the substrates being glued together, stress concentrations in the joint become more pronounced. Generally, improved bond strengths were obtained when the lower modulus adhesives and substrates were paired together. Likewise, higher modulus adhesives performed better on stiffer substrates. An examination of bonding similar and dissimilar substrates, found that, due to the mismatch in mechanical properties, the bi-material systems often had lower strengths compared to the same-material system.

Tuning a polymeric adhesive to specific moduli, thereby matching the moduli of the substrates, provides an ability to "dial in" polymer moduli for specific substrates to help solve problems such as rubber-to-metal bonding in motor mounts for the automotive industry, tendon-to-bone joinery for biomedical applications, and construction of aerospace vehicles. An ability to match the adhesive and substrate moduli will improve joint performance. Also important are strength and ductility of adhesive materials. In lap shear bond configurations, the points of highest stress are at the edges. Use of brittle adhesives makes this stress concentration even more pronounced. Stiff adhesives with low ductility (i.e., percent elongation) foster crack propagation. A more flexible, ductile adhesive can undergo plastic deformation and extend to high elongation percentages, allowing the mechanical load to distribute throughout the joint in a more uniform manner. However, a problem emerges in that material ductility gains are typically incorporated at the expense of material strength. A highly ductile adhesive is often a weak material and can only sustain minimal loads. Studies with different adhesive chemistries and hybrid designs that use separated segments of stiff and flexible glues along the bondline have shown that ductility does influence joint strength, yet the optimum balance between strength and ductility often remains unclear.

Studies have been carried out with a simplified mimic of mussel adhesive proteins, poly[(3,4-dihydroxystyrene)-co-styrene]. By exploring changes to the polymer composition, molecular weight, and formulation (e.g., polymer concentration, cure time, cure temperature, and adding fillers) we have been able to, in some cases, obtain strengths higher than commercial products such as "Super Glue." Modifications to this styrene-based system have also provided insight into a more compliant adhesive. Oligo(ethylene glycol) chains were added to poly[(3,4-dihydroxystyrene)-co-styrene] to yield poly{[3,4-dihydroxystyrene]-co-[4-vinylbenzyl{methyltetra(ethylene glycol)}]-co-styrene}. When working with this system, we noticed that increasing oligo(ethylene glycol) content resulted in less brittle polymers. Although we may have been able to work with this polymer to gain insight into how to tune an adhesive to obtain different mechanical properties, the six step synthesis became cumbersome. We have now turned to a methacrylate-based biomimetic polymer that can display a wide variety of moduli and be made in only two steps.

An ideal adhesive should have an optimum balance between strength and ductility, while also displaying a modulus similar to the substrates being bonded together. To the best of our knowledge, there are no published systematic data examining the interplay between strength, ductility, and modulus, within an adhesive material in relation to the modulus of the substrates being bonded together. Gaining insights on the interplay between these critical parameters will allow us to create the strongest adhesive joints possible.

Here, a family of biomimetic terpolymers were synthesized with varying amounts of methyl methacrylate and poly(ethylene glycol) methyl ether methacrylate (PEG), while keeping dopamine methacrylamide constant. Incorporation of the methyl methacrylate monomer brought about stiffness whereas the PEG chains appended to an acrylate monomer promoted flexibility. The adhesive monomer was dopamine methacrylamide representing the DOPA of mussel proteins. Each of these polymers was then adhered to substrates of differing stiffness. Starting from a biomimetic design, we were able to systematically modify an adhesive and identify regions of maximum bonding performance. In the end, the highest performance bonds were found where the strength and ductility of the adhesive were complementary.

A family of adhesive terpolymers with the structure shown in Scheme 1 was obtained via radical polymerization. The dopamine methacrylamide adhesive monomer was prepared in bulk (~10 grams) following a published procedure. When incorporating this compound into the backbone, ~33 mole percent was targeted given that an analogous composition showed the highest adhesion with poly[(3,4-dihydroxystyrene)-co-styrene]. The other monomers used here were commercially available poly(ethylene glycol) methyl ether methacrylate (Mn~300 g mol$^{-1}$) and methyl methacrylate. Molecular weights above ~5,000 g mol$^{-1}$ are preferred for obtaining bulk adhesion. Consequently, molecular weights above this value were targeted.

Scheme 1: An adhesive random terpolymer that can be tuned to have specific mechanical properties by controlling the amount of methyl methacylate versus poly(ethylene glycol) methyl ether methacrylate monomers dopamine methacrylamide, a mimic of DOPA provides adhesion | methyl methacrylate, provides stiffness | poly(ethylene glycol) methyl ether methacrylate, provides flexibility Polymer characterization was carried out with proton nuclear magnetic resonance ($^1$H NMR) spectroscopy and gel permeation chromatography (GPC) (Table 1). The final percentage of monomers in the backbone followed the initial feeds. The dopamine methacrylamide content ranged from ~28-36 mole percent, with methyl methacrylate and poly(ethylene glycol) methyl ether methacrylate (PEG) varying intentionally from ~0-70 mole percent. The number-average molecular weights (Mn) ranged from ~6,000 g mol$^{-1}$ to ~25,000 gmol$^{-1}$ with polydispersity indices (PDIs) of 1.3-2.0 (Table 1). Thermal characterization using differential scanning calorimetry (DSC) was met with limited success. The glass transition temperatures (Tg) for the 100% poly(methyl methacrylate) and 100% oligo(dopamine methacrylamide) homopolymers were ~110° C. and ~88° C., respectively. For poly[(dopamine methacrylamide) 35%-co-(methyl methacrylate) 65%], the Tg was at ~113° C. Using DSC to identify glass transition temperatures became more complicated with PEG chains added to the polymers. The Tg of a poly[(ethylene glycol) methyl ether methacrylate] homopolymer has been reported to be ~57° C. For all PEG-containing terpolymers here, a quite broad endothermic peak appeared from ~5° C. to ~75° C. Since a single peak was observed by DSC, random arrangement of the monomers in the backbone was quite likely. In an effort to gain more specific insights on the nature of these polymers, a melting temperature apparatus was used to locate potential thermal transitions. For poly {[dopamine methacrylamide] 28%-co-[poly(ethylene glycol) methyl ether methacrylate] 72%}, without methyl methacrylate, the sample was a viscous gel and could not be tested. At 0% PEG, 65% methyl methacrylate, and 35% dopamine methacrylamide, the sample started deforming at ~140° C. With 52% PEG, 16% methyl methacrylate, and 33% dopamine methacrylamide, this high PEG sample began deforming at 40° C. Although not precise, these data do show that the incorporation of PEG into the polymers decreased the glass transition temperatures.

TABLE 1

Composition and molecular weight data for a family of poly{[dopamine methacrylamide]-co-[methyl methacrylate]-co-[poly(ethylene glycol) methyl ether methacrylate]} heteropolymers.

| dopamine methacrylamide [mole %] | methyl methacrylate [mole %] | poly(ethylene glycol) [mole %] | $M_n$ [g mol$^{-1}$] | $M_w$ [g mol$^{-1}$] | PDI |
|---|---|---|---|---|---|
| 0 | 100 | 0 | 12 200 | 17 800 | 1.5 |
| 35 | 65 | 0 | 5 900 | 8 100 | 1.3 |
| 34 | 58 | 8 | 5 300 | 7 400 | 1.4 |
| 34 | 54 | 12 | 6 100 | 8 100 | 1.3 |
| 36 | 41 | 23 | 21 000 | 35 400 | 1.7 |
| 34 | 32 | 34 | 10 000 | 14 000 | 1.4 |
| 29 | 27 | 45 | 10 400 | 20 400 | 1.9 |
| 33 | 16 | 52 | 12 600 | 21 000 | 1.7 |
| 28 | 0 | 72 | 24 900 | 51 000 | 2.0 |

Eight polymers with similar amounts of dopamine methacrylamide (28% to 36%) and varying amounts of methyl methacrylate (0% to 65%) versus poly(ethylene glycol) methyl ether methacrylate (PEG) (0% to 72%) were synthesized and their lap shear properties tested. No external cross-linking agents were added. Lap shear is one of the most common ways to evaluate bulk adhesion and was thus used here. Studies on both stiff (elastic modulus 69 GPa) and flexible (elastic modulus<1 GPa) substrates were conducted to better evaluate the effect of matching the substrate and adhesive moduli. Many of our prior studies have bonded aluminum substrates cleaned by the ASTM D2651 standard method. Consequently, lap shear adhesion studies here began with aluminum. Adhesion is defined as the maximum load at failure divided by the glue-covered substrate overlap area.

Past studies with a styrene-based polymer showed that oligo(ethylene glycol) chains could influence adhesion in some cases. Up to ~18 mole percent oligo(ethylene glycol)-containing monomer could be copolymerized with styrene and 3,4-dihydroxystyrene without seeing any adhesion penalty, reaching ~2.5 MPa on polished aluminum. With more than ~18% of the oligo(ethylene glycol) monomer, adhesion diminished significantly, down to ~0.3 MPa at 35% oligo(ethylene glycol).

Figure 2:
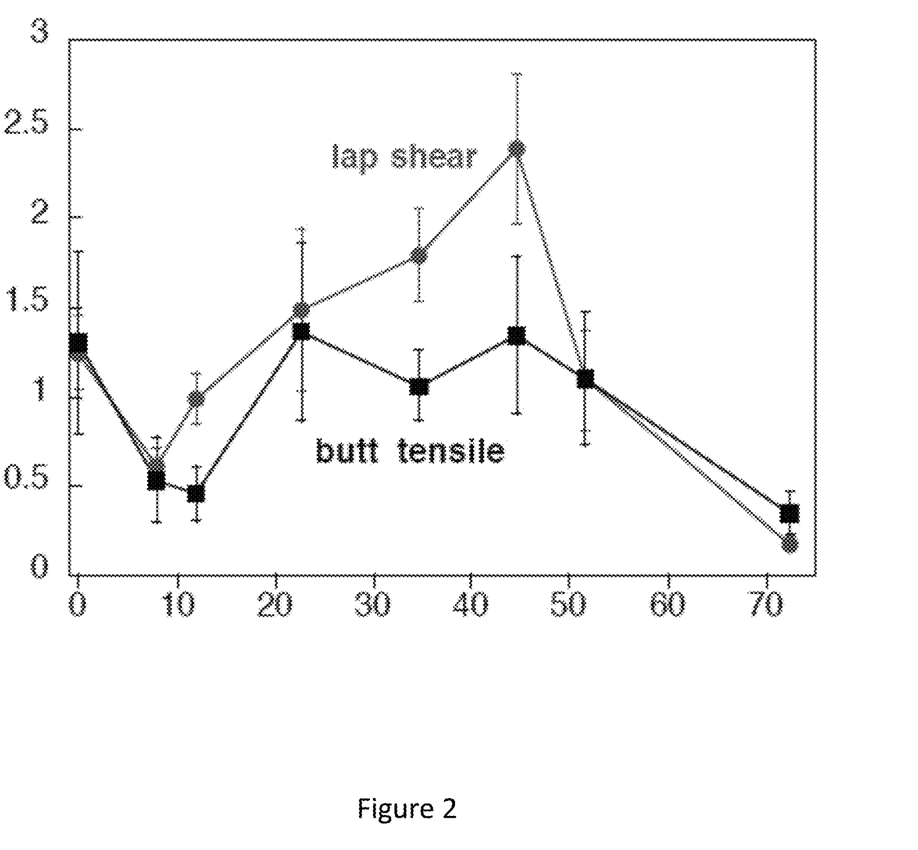
FIG. 2 is a graph depicting lap shear adhesion (line with circles) and butt tensile adhesion (line squares) of heteropolymers bonded to aluminum substrates. The heteropolymers each contain approximately 33 mole percent dopamine methacrylamide and varying percentages of methyl methacrylate versus poly(ethylene glycol) methyl ether methacrylate. The Y-axis indicates the adhesion strength measured in megapascals. The X-axis indicates the mole percent poly(ethylene glycol) methyl ether methacrylate in the heteropolymer, the compositions of each heteropolymers being listed in Table 1.

For the methacrylate-based polymer used in this disclosure, initial incorporation of PEG resulted in a slight decline in adhesion between 8 to 12 monomer percent. As shown in FIG. 2, at loadings of 23% PEG, adhesion started to rise, reaching ~1.5 MPa. The peak in adhesion at ~2.4 MPa was obtained with 45% PEG in the backbone. At 72%, the highest loading of PEG, adhesion then decreased down to ~0.2 MPa. Common commercial adhesives were tested on aluminum to obtain a comparison of bonding performances. Under similar conditions, poly(vinyl acetate) Elmer's Glue All adhered at ~4 MPa, cyanoacrylate Krazy Glue at ~7 MPa, and Loctite epoxy at ~11 MPa.

If trying to obtain gains in strength by matching the modulus of the adhesive and the substrate, one might expect that the stiffest substrate (e.g., aluminum in this case) would bond best with the highest modulus adhesive examined. In other words, the 0% PEG polymer, poly[(dopamine methacrylamide) 35%-co-(methyl methacrylate) 65%], the left most point in FIG. 2, might be the strongest bonding glue on aluminum. Yet we see the peak in adhesion at 45% mole percent of the softening PEG monomer. Improving bond strengths does not appear to be as simple as just matching the modulus of the adhesive and the substrate. Ductility and strength of the adhesive material must now be considered.

Figure 3A:
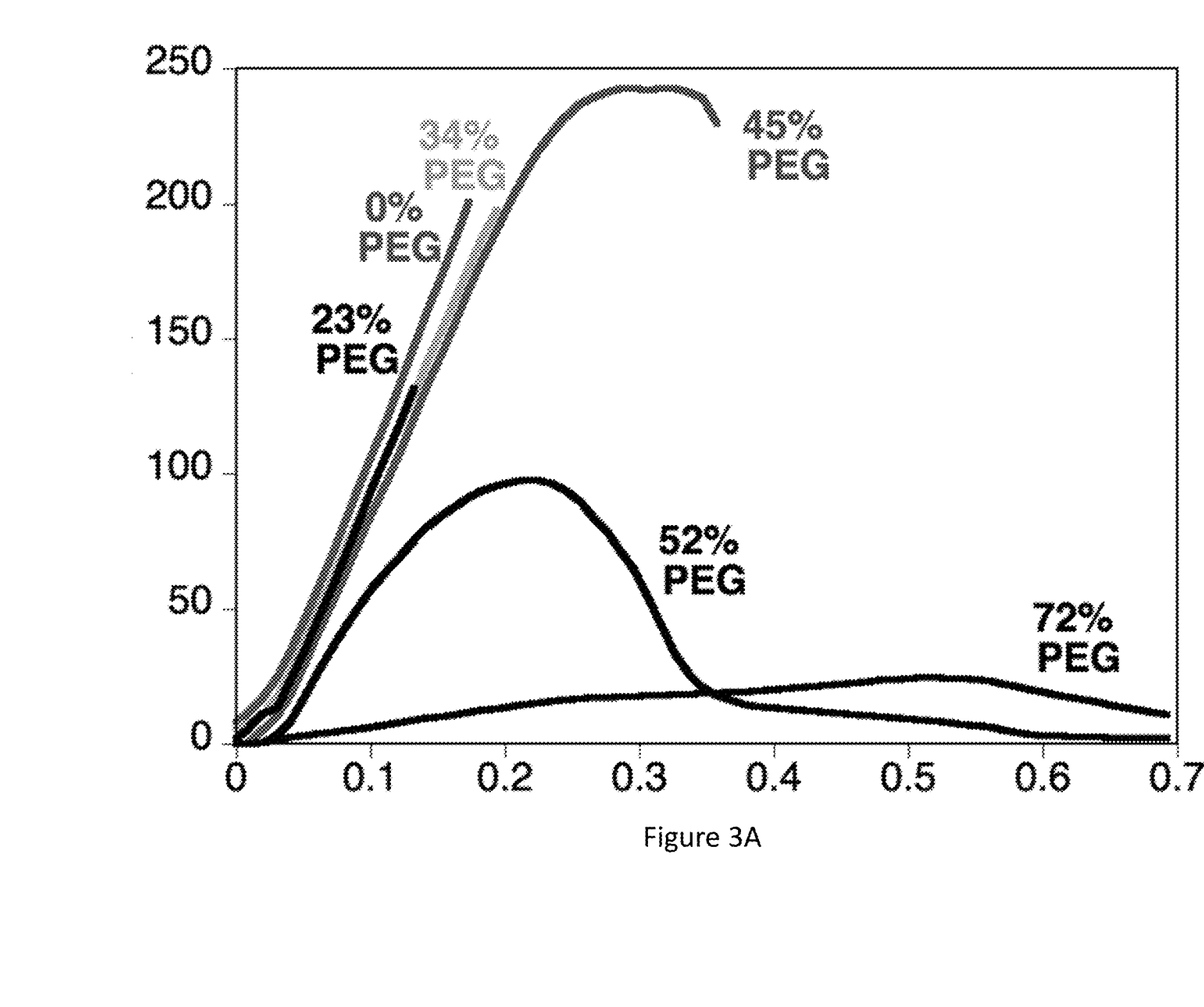
FIG. 3A is a graph depicting force versus extension curves from lap shear adhesion testing of heteropolymers bonded to aluminum substrates. The heteropolymers each contain approximately 33 mole percent dopamine methacrylamide and varying percentages of poly(ethylene glycol) methyl ether methacrylate (PEG), the remaining percentage being methyl methacrylate. The compositions of each heteropolymer are listed in Table 2. The Y-axis indicates the force measured in Newtons and the X-axis indicates the length of extension measured in millimeters.

When examining the force versus extension curves from lap shear testing of the adhesive terpolymers, a dramatic effect of PEG became evident (FIG. 3A). These curves are the raw data from adhesion measurement experiments in which a bonded pair of substrates were pulled until failure. Adhesion values reported here use the highest force observed prior to failure. The sharp curves seen for 0%, 11%, 23%, and 34% PEG are indicative of brittle fracture. At loadings of 45% PEG and above, the force versus extension curves became more rounded. The high PEG polymers appeared to be softening. By incorporating PEG, a brittle to ductile transition may have occurred.

Figure 3B:
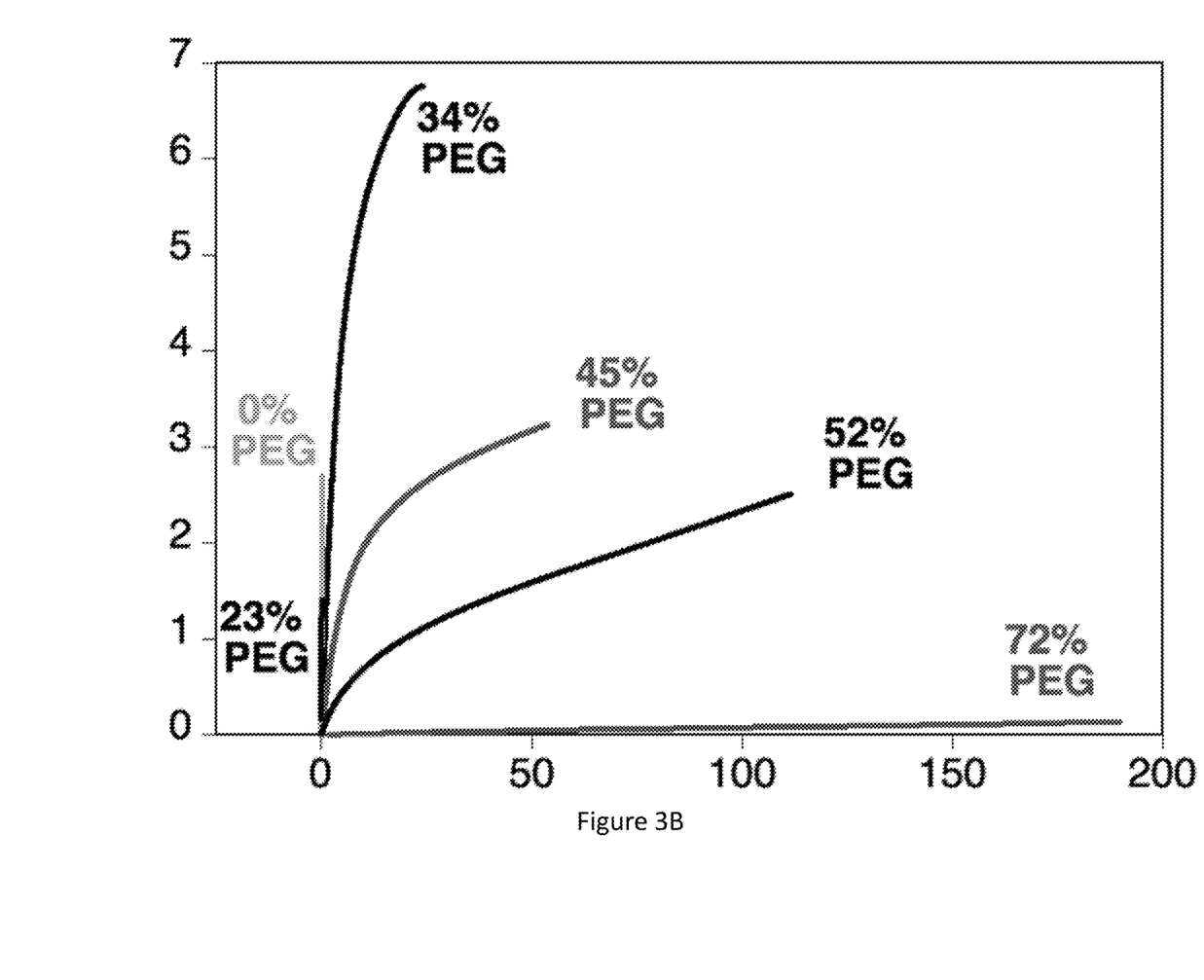
FIG. 3B is a graph depicting stress versus strain when adhesive heteropolymers were cast into thin films and tested in tension. The heteropolymers contain approximately 33 mole percent dopamine methacrylamide and varying percentages of poly(ethylene glycol) methyl ether methacrylate (PEG), the remaining percentage being methyl methacrylate. The compositions of each heteropolymer are listed in Table 2. The Y-axis indicates the stress measured in megapascals and the X-axis indicates the strain measured in percentage ((final length−initial length)/initial length)×100.

For examining potential changes to mechanical properties, the adhesive polymers were cast into thin films. Dynamic mechanical analysis in the controlled force mode was used to obtain stress versus strain data (FIG. 3B), the percent elongation of the adhesive polymers being a measurement of the ductility of the polymers. The polymers containing 0% and 23% PEG proved to be incredibly fragile when in a film of ~0.3 mm thickness. If bent at all, the sample would fail catastrophically into numerous pieces. We were only able to obtain estimates of mechanical properties. With more PEG included, the films became increasingly durable, flexible, and workable. The samples containing the most PEG were malleable enough to be easily folded in half. The elastic moduli of these heteropolymers ranged from 0.0002 at 72% PEG to ~2 GPa at 0% PEG (Table 2). For comparison, stiff commercial adhesives including epoxies have elastic moduli in the range of ~3 to 5 GPa. Flexible adhesives such as poly(urethanes) are lower at ~0.1 GPa.

TABLE 2

Mechanical properties for a family of poly{[dopamine methacrylamide]-co-[methyl methacrylate]-co-[poly(ethylene glycol) methyl ether methacrylate]} heteropolymers.

| dopamine methacrylamide [mole %] | methyl methacrylate [mole %] | poly(ethylene glycol) [mole %] | Elastic modulus [GPa] | Yield stress [MPa] | Ultimate tensile strength [MPa] | Strain [%] |
|---|---|---|---|---|---|---|
| 35 | 65 | 0 | ~2 | N/A[a] | ~3 | ~0.2 |
| 36 | 41 | 23 | 1.3 ± 0.5 | N/A[a] | 2 ± 1 | 0.1 ± 0.1 |
| 34 | 32 | 34 | .015 ± 0.01 | 5 ± 1 | 7 ± 1 | 30 ± 10 |
| 29 | 27 | 45 | 0.042 ± 0.002 | 2.2 ± 0.4 | 4 ± 1 | 90 ± 30 |
| 33 | 16 | 52 | 0.012 ± 0.001 | 1.1 ± 0.1 | 2.2 ± 0.3 | 110 ± 20 |
| 28 | 0 | 72 | 0.00019 ± 0.00003 | N/A[b] | >0.1[b] | >190[b] |

[a]Specimens did not yield
[b]Specimens did not fail prior to reaching the extension limit of the instrument When transitioning from the 23% PEG to the 34% PEG polymer, a shift from elastic to plastic deformation was observed. The stress versus strain curve for the terpolymers containing 34% PEG was no longer linear, displaying a yield point, the stress at which the material began to deform plastically. With this shift came a rise in ductility, which could be quantified by the strain at break. With increasing amounts of PEG, the strain at break rose from ~0.2% for the 0% PEG polymer to over 190% for the 72% PEG polymer. The 72% PEG specimens never actually failed, reaching the extension limit of the instrument at 190%. Although the terpolymer containing 34% PEG displayed the highest mechanical strength (~7 MPa) and intermediate ductility (~27%), this polymer was not the one exhibiting the highest adhesion. The peak adhesion on aluminum was obtained at 45% PEG. This balance between strength (~4 MPa) and high ductility (~88%) appears to provide the highest adhesion.

Figure 4A:
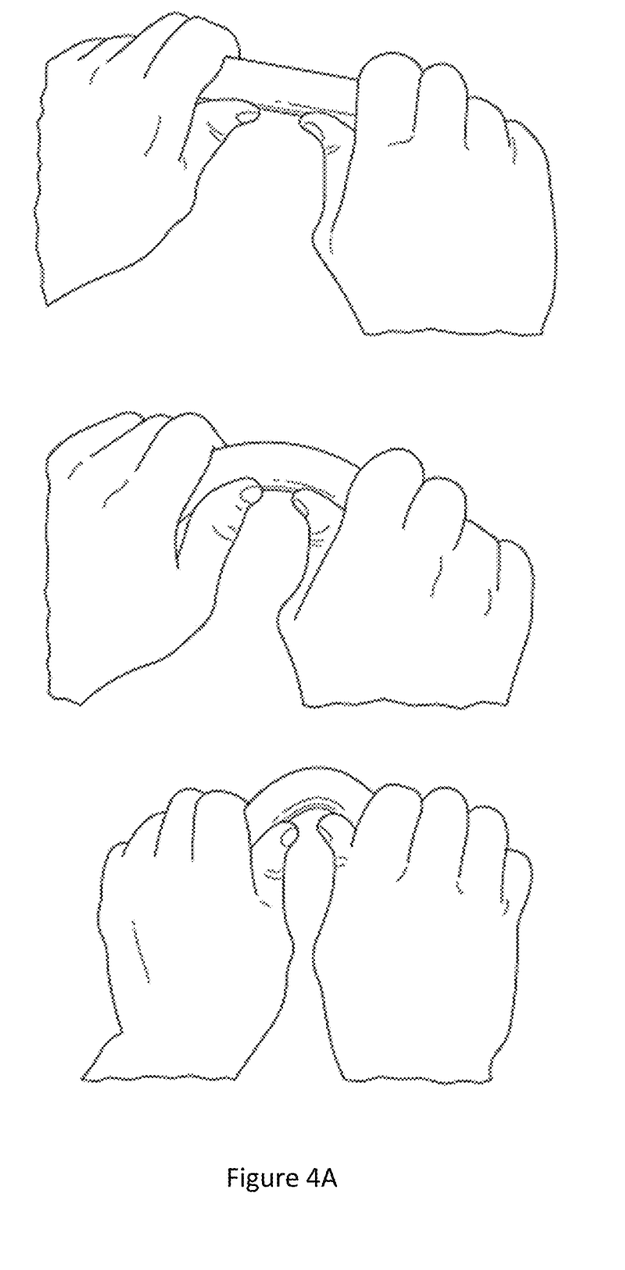
FIG. 4A is a set of three images depicting the flexibility of polyurethane substrates with Shore hardness 75D (top panel), 80A (middle panel) and 40A (bottom panel).

Adhesion tests on substrates of varying stiffness were then conducted to determine if increases in bonding strengths could be observed when the moduli of both the glue and substrate were chosen to be similar. Poly(urethane) substrates were purchased in a wide range of durometer hardnesses (FIG. 4A). The most flexible substrate, poly(urethane) of 40 Shore A hardness, felt similar to a flexible rubber. The stiffest substrate, 75D Shore D poly(urethane), was comparable to a construction hard hat. With a hardness between these two other substrates, 80 Shore A poly(urethane) was slightly malleable, similar to that of a shoe heel. Other common plastic substrates tested were poly(methyl methacrylate) and poly(vinyl chloride). Mechanical properties of each material were determined by fabricating dumbbell-shaped specimens and testing in tension following the ASTM D638 standard method (Table 3). The elastic moduli of these plastic substrates varied from 0.001 to ~1 GPa. Contact angle measurements showed that the surface energies for the substrates were generally similar (Table 3).

When bonding together the softer poly(urethane) substrates in lap shear configurations, the joints flexed and bent during adhesion testing. Due to additional stresses on the joints from this bending, results were not considered reliable. Subsequently, we explored another simple adhesion configuration with butt tensile joints. For comparison to the lap shear results, testing of all heteropolymers was repeated in the butt tensile configuration on aluminum (FIG. 2). These data are overlaid with the analogous lap shear experiments described earlier (FIG. 2). A roughly similar relation of adhesion versus PEG content was observed with both butt tensile and lap shear joints. Changes in adhesion relative to PEG content were more subtle, however. This observation of a flatter trend in butt tensile versus lap shear may be a result of glues being more ductile in shear than in tension. If a flaw (e.g., void due to evaporation of solvent) exists in a butt tensile joint, once a crack is triggered, the specimen will fail quickly due to this high stress concentration. In lap shear, if cracking at a void occurs, the remaining adhesive area is still available to deform, by withstanding higher strains. A consequence here is that butt tensile bonding may not have as much to gain from the added PEG ductility as a lap shear joint.

Figure 4B:
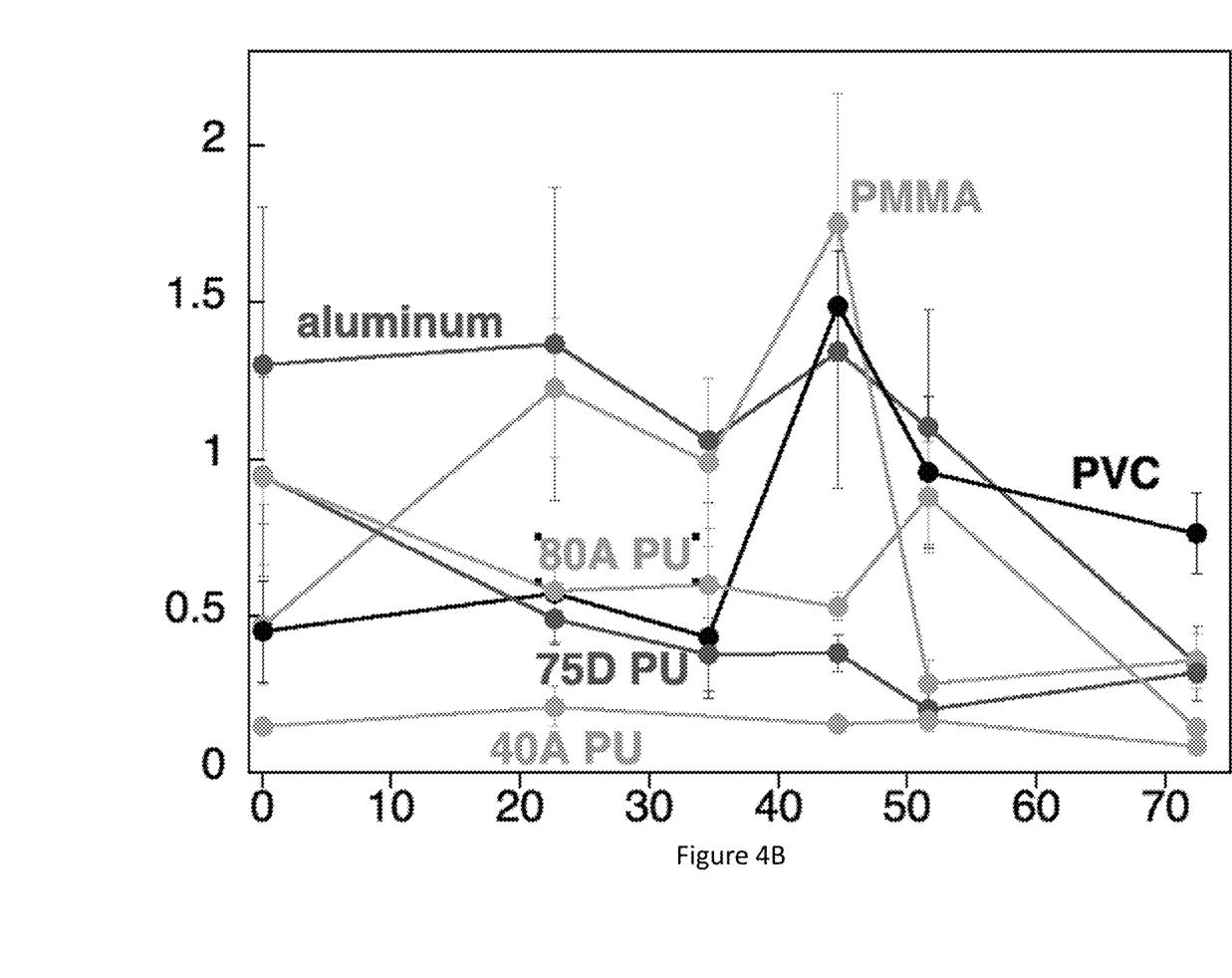

With a bonding testing method in hand, the entire family of moduli-tuned adhesives was tested on the five plastic substrates of varying stiffness (Table 3). Substrates with the highest elastic modulus at ~1 GPa were poly(methyl methacrylate) (PMMA) and poly(vinyl chloride) (PVC). For both PMMA and PVC substrates, adhesion peaked at 45% PEG, reaching ~2 MPa (FIG. 4B). Adhesion for this 45% PEG terpolymer on these two plastic substrates was slightly higher than that for aluminum in butt tensile (~1.3 MPa) (FIGS. 2 and 4B). The modulus of the 45% PEG terpolymer at ~0.04 GPa (Table 2) is more similar to the moduli of these plastics (~1 GPa) than to that of aluminum at ~69 GPa. Still, the adhesive is ~25 times less stiff than PMMA and PVC. The rise in adhesion at a point of 45% PEG content was likely a result of the adhesive having ductility from the PEG, being able to deform plastically. This ductility and plasticity allows mechanical stresses to be redistributed throughout the material while testing occurred.

The most flexible substrate, 40A poly(urethane) with an elastic modulus of only ~0.001 GPa (Table 3), displayed the lowest adhesion at ~0.2 MPa for all terpolymers (FIG. 4B). Due to the flexibility of this substrate, both the adhesive and substrate were being stressed during testing. The lack of stiffness prohibits a strong adhesive bond. Generally speaking, substrates of low strength and high flexibility are difficult to bond well, regardless of the adhesive used.

The stiffest poly(urethane) substrate, 75D, had an elastic modulus of ~0.5 GPa (Table 3). On 75D poly(urethane), adhesion was highest at 0% PEG and gradually decreased with increasing amounts of this monomer added to the polymer (FIGS. 4A and 4B). Tensile tests revealed that this substrate could be extended to high strains (~339%) prior to failure (Table 3). Due to this high substrate extensibility, having PEG in the adhesive to promote ductility was not necessary to achieve stronger bonds. All the needed flex-

TABLE 3

Water contact angles and mechanical properties of aluminum and plastic substrates.

| | water contact angle [°] | elastic modulus [GPa] | yield stress [MPa] | ultimate tensile stress [MPa] | strain [%] |
|---|---|---|---|---|---|
| aluminum[57] | 90 ± 2 | 69 | 276 | 310 | 17 |
| poly(methyl methacrylate) | 79 ± 3 | 0.89 ± 0.04 | 82 ± 2 | 87 ± 1 | 12 ± 1 |
| poly(vinyl chloride) | 83 ± 3 | 0.8 ± 0.1 | 50 ± 1 | 40 ± 4 | 140 ± 60 |
| 75D poly(urethane) | 81 ± 4 | 0.5 ± 0.1 | N/A [a] | 27 ± 5 | 340 ± 70 |
| 80A poly(urethane) | 85 ± 5 | 0.016 ± 0.001 | N/A [a] | >6 ± 1 | >430 ± 80 |
| 40A poly(urethane) | 86 ± 7 | 0.00115 ± 0.00002 | N/A [a] | 1.6 ± 0.1 | 240 ± 20 |

[a] Specimens did not yield.

ibility was already in the substrate. Additional ductility from PEG only served to weaken the system.

The 80A poly(urethane) substrate had an elastic modulus (~0.02 GPa) higher than 40A poly(urethane) (~0.001 GPa) and lower than 75D poly(urethane) (~0.45 GPa) (Table 3). A slight rise in adhesion was seen at 52% PEG. At this 52% PEG content, the elastic modulus of the adhesive (~0.01 GPa) (Table 2) was a close match to that of the substrate. For this substrate, the strain at break was so high (>430%) that additional ductility from the adhesive polymer was not required in order to achieve maximum bond strength. Designing the adhesive such that the adhesive elastic modulus is similar to that of the substrate elastic modulus may be more important here.

For substrates with higher elastic moduli (>1 GPa) such as aluminum, PMMA, and PVC, the point of maximum bonding can be found where the adhesive provides ductility, but can also maintain strength (Table 2). Thus for the bonding of metals and commodity plastics, matching the adhesive and substrate moduli is not necessarily the most critical factor. Ductility and the resulting decrease in elastic modulus can yield the highest bond strengths (FIG. 2). Too much ductility will weaken the adhesive and bond strengths may suffer. When the elastic modulus of the substrate is above that of flexible rubber (~0.001 GPa) or below that of common plastics (~1 GPa), ductility is often built into the substrate (Table 3). Adding ductility to the adhesive will not benefit the joint performance (FIGS. 4A and 4B). For these softer substrates, the adhesive may work best when the modulus is comparable to that of the substrate.

Poly(ethylene glycol) is one of the most widely used polymers within the biomedical industry and also the focus of countless academic studies. Amongst the greatest aspects of this polymer is biocompatibility. In a sense, this lack of toxicity has origins in a lack of adhesion. Although the exact reasons behind the biocompatibility of PEG are still debated, the most accepted idea is that water attaches to the polymer's oxygens via hydrogen bonds. The resulting hydrated structure, in essence, looks just like water. Macromolecules and cells do not "see" the polymer, do not adhere, and no biological response such as immunogenicity takes place.

Data presented herein show that the anti-adhesive effects of PEG can be more complex. High PEG content within the polymer increased ductility, weakened the material strength, and could decrease adhesion. However, moderate levels of PEG actually increased adhesion. When considering the anti-adhesive or anti-fouling effects of PEG, we should likely keep in mind which mechanisms are most relevant to the situation at hand.

Prior studies examining adhesive modulus or ductility are few, with the available data being derived from, effectively, mixing fillers into commercial adhesives. Here, we varied the composition of a heteropolymer, without adding external fillers, flexibilizers, plasticizers or cross-linkers. This approach also avoided phase separations, such as those observed with rubber-toughened epoxies. Tuning the amount of methyl methacrylate and PEG in the polymer provided adhesives with moduli ranging from ~0.0002-2 GPa, strengths from ~0.1-3 MPa, and strains from ~0.2-200%. By synthesizing these heteropolymers, there was more control over the structure, allowing a wider range of mechanical properties when compared to prior studies. This type of a systematic method allowed us to identify the point at which strength and ductility were complementary, leading to a toughened adhesive.

These data also shed light on some general design principles for making glues. Addition of poly(ethylene glycol) into the polymer chains allowed identification of the point at which both strength and ductility were balanced. Where adhesion peaked was also quite dependent upon the nature of the substrate being bonded. Although matching the moduli of adhesives to substrates should be considered, tuning the adhesive ductility is at least of equivalent importance. Further insights were provided on the anti-adhesive or anti-fouling aspect of PEG. Increased ductility and decreased material strength with PEG can influence adhesion significantly, but by a mechanism quite different than that found for materials placed in biological or aqueous contexts.

General Procedures:

A Varian Inova-300 MHz spectrometer was used to record proton nuclear magnetic resonance ($^1$H NMR) spectra. In order to integrate the peaks accurately, a relaxation delay of 30 s between scans was implemented. Monomer ratios in the final polymers were determined by integration of the aromatic region (δ: 6.2-6.7 ppm) to give dopamine methacrylamide content, the —OCH$_2$ peak at 3.8-4.2 ppm for poly (ethylene glycol methyl ether methacrylate) content, and the backbone region (δ: 0-2.3 ppm) for methyl methacrylate content.

Molecular weights were found by gel permeation chromatography (GPC) using a Polymer Laboratories PL-GPC20 with eluent THF. Water contact angles for all substrates were determined using a Ramé-Hart Advanced Goniometer/Tensiometer Model 500. Thermal transitions were observed with a Perkin Elmer Jade Differential Scanning calorimeter (DSC) from −40° C. to 140° C. at 5° C. min$^{-1}$.

Figure 5:
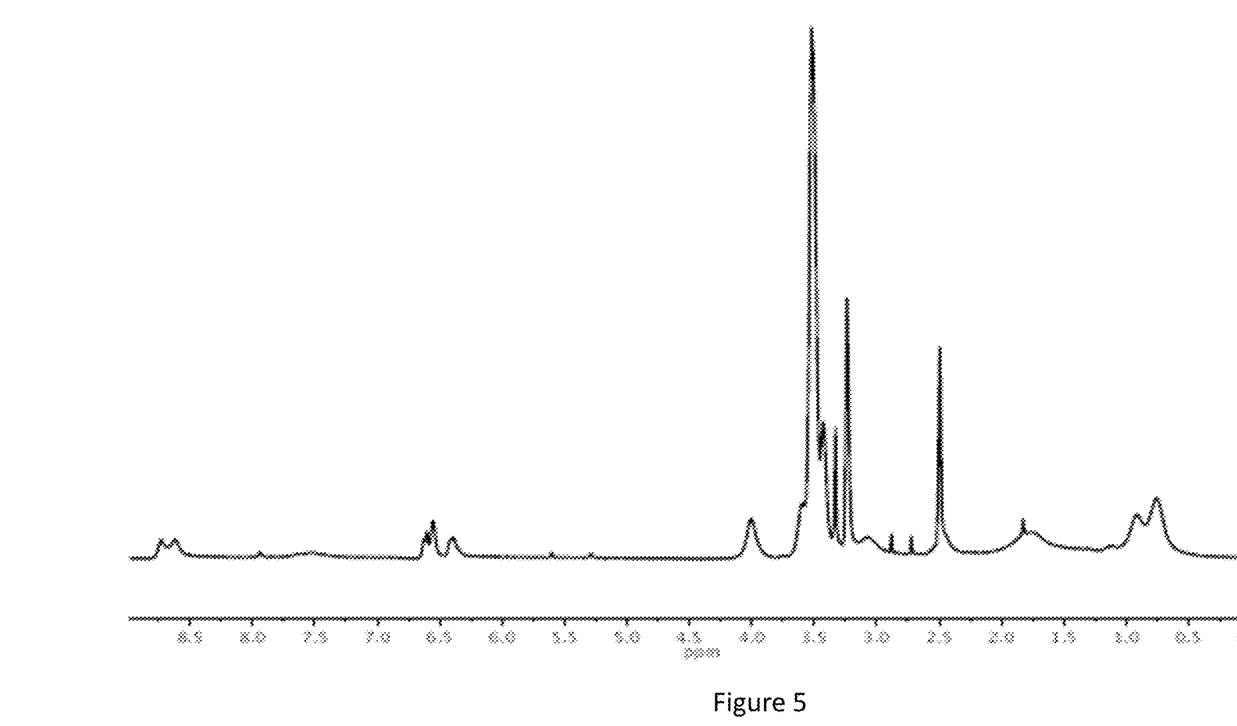
FIG. 5 is a $^1$H NMR spectrum in $d^6$-DMSO of poly{[dopamine methacrylamide]-co-[methyl methacrylate]-co-[poly(ethylene glycol) methyl ether methacrylate]} terpolymer. Assignments are: δ 0-2.3 ppm (broad, polymer backbone), 3.2 ppm (broad, —OCH$_3$ from poly(ethylene glycol) methyl ether methacrylate), 3.4-3.7 (broad, —OCH$_2$CH$_2$ from poly(ethylene glycol) methyl ether methacrylate and —OCH$_3$ from methyl methacrylate), 3.8-4.2 ppm (—OCH$_2$ from poly(ethylene glycol) methyl ether methacrylate), 6.2-6.7 ppm (broad, aromatic), and 8.5-8.8 ppm (broad, hydroxyl).

Methyl methacrylate and poly(ethylene glycol) methyl ether methacrylate (Mn-300 g mol$^{-1}$) monomers were purchased from Sigma Aldrich and purified using an alumina column. This Mn translates to an oligo(ethylene glycol) (OEG) chain length of ~4.3 ethylene glycol repeats. Synthesis of the dopamine methacrylamide monomer followed a published procedure and characterization employed 1H NMR spectroscopy, as shown in FIG. 5. All polymers were prepared by free radical polymerization under an inert argon atmosphere using typical Schlenk techniques. The radical initiator, azobisisobutyronitrile (AIBN), was recrystallized from methanol and dried in vacuo prior to use. DMF solvent was kept over sieves and degassed with bubbling argon for at least 15 minutes prior to starting a reaction. To synthesize a family of terpolymers with target monomer compositions, the ratio of methyl methacrylate to poly(ethylene glycol) methyl ether methacrylate was altered in the feed. The content of dopamine methacrylamide in the polymer was always targeted to be 33 mole %.

Combining a radical initiator such as AIBN with a radical inhibitor such as a catechol compound may appear to be counterintuitive. Several research groups have been producing acrylate polymers, often containing dopamine methacrylamide, using the general synthetic methods described below. This class of polymer can contain varied degrees of cross-linking at the end of the synthesis. From this report and our target of ~33% dopamine methacrylamide, we may surmise that the polymers described below contain roughly one cross-link for every third polymer. In other words, the degree of cross-linking in the materials synthesized for this current disclosure is quite low. Prior to adhesion studies, the majority of isolated polymer chains are free of any cross-links.

Synthesis of poly{[dopamine methacrylamide]-co-[methyl methacrylate]-co-[poly(ethylene glycol) methyl ether methacrylate]}

Dopamine methacrylamide (1.5 g, 6.7 mmol), methyl methacrylate (0.68 mL, 6.4 mmol), poly(ethylene glycol) methyl ether methacrylate (1.9 mL, 6.5 mmol), and AIBN (31.6 mg, 0.192 mmol) were dissolved into dimethylformamide (14 mL) in a flame dried Schlenk flask. After stirring for 30 minutes under argon and at room temperature, the flask was placed into an 80° C. oil bath for 2 days. The reaction mixture became a viscous solution. The flask was removed from the oil bath and 1 mL of methanol was added to quench the reaction. To the cooled reaction was added dichloromethane (~10 mL) for dilution. The solution was then poured into excess ether (~200 mL) to precipitate a white polymer. The product was reprecipitated two additional times in dichloromethane/ether. Sonication along with minimal methanol was often necessary to solubilize the polymer. The product was dried in vacuo for two nights yielding 3.3 g (81%) of pure polymer.

Synthesis of poly{[dopamine methacrylamide]-co-[poly(ethylene glycol) methyl ether methacrylate]}

Dopamine methacrylamide (0.89 g, 4.1 mmol), poly(ethylene glycol) methyl ether methacrylate (2.2 mL, 7.5 mmol), and AIBN (18.7 mg, 0.14 mmol) were dissolved into dimethylformamide (9 mL) in a flame dried Schlenk flask. After stirring for 30 minutes under argon and at room temperature, the flask was placed in a 65° C. oil bath for 5.5 hours. At this point, the reaction mixture was starting to gel. The flask was removed from the oil bath and 1 mL of methanol was added to quench the reaction. The reaction mixture was poured into excess ether (150 mL) to precipitate a white polymer. The product was reprecipitated two additional times in dichloromethane/ether and then dried in vacuo for two nights.

Synthesis of poly[(dopamine methacrylamide)-co-(methyl methacrylate)]

Dopamine methacrylamide (1.1 g, 5.1 mmol), methyl methacrylate (1.0 mL, 9.5 mmol), and AIBN (23.6 mg, 0.14 mmol) were dissolved into dimethylformamide (7 mL) in a flame dried Schlenk flask. After stirring for 30 minutes under argon at room temperature, the flask was placed in a 70° C. oil bath for 17 hours. The reaction mixture became a viscous solution. Upon removal from the oil bath, 1 mL of methanol was added. To the cooled reaction was added ~5 mL of dichloromethane for dilution. This solution was poured into excess ether (~200 mL) to precipitate a brownish-white polymer. The product was reprecipitated two additional times in dichloromethane/ether and then dried in vacuo for two nights.

Synthesis of Poly(Methyl Methacrylate)

Methyl methacrylate (2.45 mL, 22.9 mmol) and AIBN (37 mg, 0.23 mmol) were added to anhydrous toluene (15 mL) in a flame dried Schlenk flask. After stirring for 30 minutes at room temperature under argon, the flask was placed into a 75° C. oil bath overnight. The flask was removed from the oil bath and 1 mL of methanol was added. This reaction mixture was poured into excess hexanes (150 mL) to precipitate a white polymer. The product was reprecipitated two additional times in dichloromethane/hexanes and then dried in vacuo for two nights.

Mechanical Properties:

Stress versus strain curves were obtained for the DOPA-containing terpolymers using dynamic mechanical analysis (TA Instruments Q800) in tension with controlled force (0.10 N minute$^{-1}$). A preload force of 0.001 N was applied. Thin film samples were prepared by solvent casting. Typically, 0.05 g of polymer was dissolved at 0.15 g mL$^{-1}$ in 10% volume trichloroethylene in methanol. Using a micropipette, the polymer solution (50 µL) was added into a custom fashioned polydimethylsiloxane mold every 30 minutes until the entire sample was formed. Samples were cured at room temperature for ~6 hours, then at 37° C. for 48 hours. Typical samples were 12.0 mm long, 3.0 mm wide, and 0.3 mm thick. To clamp into the instrument with consistent forces, a torque wrench was used. When samples had a PEG content greater than 23%, a torque of 2 in-lb was applied. For lower percent PEG samples, films could only be secured at fingertip tightness without breaking. At least three samples were tested for each trial. For the 0% PEG polymer, only one trial is reported due to how fragile the thin films were. Testing of at least 10 samples were attempted, but could not be secured into the grips without cracking. Due to the flexibility and extensibility of 72% PEG, these samples did not fail before reaching the extension limit of the instrument.

Tensile properties of the substrates were determined by the ASTM D638 standard method. Specimens were fabricated into Type IV dumbbell shapes using a CNC mill for 75D polyurethane, poly(methyl methacrylate), and poly(vinyl chloride). A water jet cutter was used for the 40A and 80A polyurethane substrates. Specimens were tested on an MTS Insight Electromechanical Testing System using a 2000 N load cell. Poly(urethane) specimens were tested at 50 mm min'. The poly(methyl methacrylate) and poly(vinyl chloride) substrates were tested at 5 mm min$^{-1}$. It should be noted that 80A poly(urethane) slipped out of the grips at high extensions for all samples due to decreasing cross-sectional area as testing.

For both adhesive films and substrates, the elastic moduli were determined from the initial slope of the linear portion of the stress-strain curve. For 75D poly(urethane) specimens the initial slope was not linear, thus the secant modulus is reported. The yield strength was defined by the 0.2% offset strain. Ultimate tensile strength was the load at fracture divided by the area. Strain was the percent elongation at break. Averages and errors at ±1 standard deviation are reported.

For lap shear tests using aluminum substrates, adherends of 8.89 cm×1.27 cm×0.318 cm were precision cut using a water jet system from a sheet of aluminum 6061-T6 purchased at Farmer's Copper. For butt tensile tests, aluminum 6061-T6 rod stock with a diameter of 1.59 cm was cut and faced to a length of 7.68 cm using a CNC mill. Holes with a diameter of 0.633 cm were drilled 0.80 cm from the top using a drill press. The adherends were cleaned according to the ASTM D2651 standard method, followed by washes in boiling, deionized water and methanol.

For lap shear and butt tensile tests using plastic substrates, toluene diisocyanate based poly(urethane) bar stock (1.27 cm×1.27 cm×61.0 cm) and rod stock (1.59 cm×122 cm) with durometer hardnesses of 40 Shore A, 80 Shore A, and 75 Shore D were purchased from Universal Urethane Products. Using a mold, specimens were cut with a Walnut Hollow Professional Hot Knife to a length of 8.89 cm for lap shear and 7.68 cm for butt tensile. Additionally for butt tensile tests, cast acrylic (i.e., PMMA) and polyvinyl chloride (Type II) rod stock with a diameter of 1.59 cm were purchased from McMaster Carr. Specimens were cut with a band saw to 8.0 cm and then a CNC lathe was used to face the ends giving a length of 7.68 cm. Using a drill press, holes with a diameter of 0.633 cm were drilled 0.80 cm from the top for 75D poly(urethane), cast acrylic, and polyvinyl chloride substrates. To clean prior to testing, soap and water were used, followed by ethanol and hexane washes. The specimens were heated at 70° C. to dry for 2 hours.

For adhesion tests, the polymers were dissolved at 0.15 g polymer mL-1 methanol, often using a sonicator. At high methyl methacrylate percentages (~41-65 mole %), the solvent used was 8% volume trichloroethylene in methanol due to solubility issues. Polymer solutions (45 µL) were deposited onto the adherends and then overlapped (1.2×1.2 cm) to form single lap-joint configurations. The use of a homebuilt jig ensured consistency of the overlap area and alignment of the joints. Two Teflon blocks on either side of the joint were pushed together to precisely align the bonded substrates. For butt tensile specimens, after applying the polymer solutions (45 µL), 60 µm soda lime borosilicate glass beads from McMaster Carr were added before overlapping in order to control the thickness. A separate jig was used to ensure proper alignment of the butt tensile substrates once overlapped. Specimens were allowed to cure for 1 hour at room temperature followed by 22 hours at 70° C. and then 1 hour at room temperature before testing. No cross-linker was added to the polymer, allowing the adhesive to cure into a transparent film with a slight brown tint.

Single lap joint specimens were tested following a modified version of the ASTM D1002 standard. Butt tensile specimens were measured by the ASTM D2095 standard method. A modified version of ASTM D2095 was followed when testing the 40A and 80A poly(urethane) substrates. Vacuum hose clamps were used to secure these substrates in place. All trials were tested on an Instron 5544 Materials Testing System with a 2000 N load cell. A crosshead speed of 2 mm min' was used. For each run, a data set of at least five samples was collected. Averages and errors at 95% confidence intervals are reported. In all cases, tested bonds showed evidence of cohesive failure, with roughly even amounts of polymer left on each substrate after bond breakage.

It should be appreciated that other materials can be used in place of those described herein, which were meant for demonstrative purposes. For example, adding PEG into other polymers also has been seen to help adhesion, which is theorized to be due to a similar mechanism of increasing ductility. The methods and polymers described can be applied to designs of adhesives in other non-acrylate systems as well, and is therefore applicable to a broader class of materials.

Various aspects of different embodiments of the present invention are expressed in paragraphs X1, X2, X3 and X4 as follows:

X1. One aspect of the present invention pertains to an adhesive composition comprising a heteropolymer including one of dopamine methacrylamide or 3,4-dihydroxyphenylalanine or 3,4-dihydroxystyrene, and at least one of methyl methacrylate, styrene, and poly(ethylene glycol) methyl ether methacrylate.

X2. Another aspect of the present invention pertains to an adhesive composition comprising a heteropolymer including a plurality of monomers including a dopamine moiety and a plurality of monomers including an acrylate moiety.

X3. A further aspect of the present invention pertains to a biomimetic polymer adhesive comprising the following components: cross-linking monomer in a proportion of about 28% to about 36% by mole percentage, stiffening monomer in a proportion of 0% to about 65% by mole percentage, and softening monomer in a proportion of about 0% to about 72% by mole percentage.

X4. A certain aspect of the present invention pertains to a method of adhering, the method comprising selecting a pair of substrates to be adhered, determining an elastic modulus of each substrate, and adhering the substrates using a heteropolymer adhesive including a plurality of cross-linking monomers and a plurality of stiffening monomers, wherein, if the elastic modulus of each of the substrates is greater than about 1 GPa, the heteropolymer adhesive further includes a plurality of softening monomers.

Yet other embodiments pertain to any of the previous statements X1, X2, X3 or X4 which are combined with one or more of the following other aspects.

Wherein the one of dopamine methacrylamide or 3,4-dihydroxyphenylalanine or 3,4-dihydroxystyrene is present in a proportion of about 10% to about 50% by mole percentage.

Wherein the one of dopamine methacrylamide or 3,4-dihydroxyphenylalanine or 3,4-dihydroxystyrene is present in a proportion of about 20% to about 40% by mole percentage.

Wherein the one of dopamine methacrylamide or 3,4-dihydroxyphenylalanine or 3,4-dihydroxystyrene is present in a proportion of about 28% to about 36% by mole percentage.

Wherein the one of dopamine methacrylamide or 3,4-dihydroxyphenylalanine or 3,4-dihydroxystyrene is present in a proportion of about 33% by mole percentage.

Wherein the heteropolymer is a terpolymer including one of dopamine methacrylamide or 3,4-di hydroxyphenylalanine or 3,4-dihydroxystyrene; methyl methacrylate or styrene; and poly(ethylene glycol) methyl ether methacrylate.

Wherein the heteropolymer is a terpolymer including dopamine methacrylamide, methyl methacrylate and poly(ethylene glycol) methyl ether methacrylate.

Wherein the heteropolymer includes dopamine methacrylamide and at least one of methyl methacrylate and poly(ethylene glycol) methyl ether methacrylate.

Wherein the heteropolymer includes 3,4-dihydroxyphenylalanine and at least one of methyl methacrylate and poly(ethylene glycol) methyl ether methacrylate.

Wherein the monomers including the dopamine moiety are dopamine methacrylamide.

Wherein the plurality of monomers including the acrylate moiety are a plurality of monomers including a methacrylate moiety.

Wherein the monomers including the methacrylate moiety are methyl methacrylate.

Wherein the monomers including the methacrylate moiety are poly(ethylene glycol) methyl ether methacrylate.

Wherein the monomers including the methacrylate moiety are methyl methacrylate and poly(ethylene glycol) methyl ether methacrylate.

Wherein at least one of the stiffening monomer and the softening monomer is a methacrylate monomer.

Wherein the stiffening monomer is present in a non-zero amount and wherein the softening monomer is present in a non-zero amount.

Wherein the stiffening monomer is methyl methacrylate.

Wherein the softening monomer is poly(ethylene glycol) methyl ether methacrylate.

Wherein the cross-linking monomer is one of dopamine methacrylamide or 3,4-dihydroxyphenylalanine.

Wherein the stiffening monomer is present in a proportion of about 16% to about 58% by mole percentage and wherein the softening monomer is present in a proportion of about 8% to about 52% by mole percentage.

Wherein the stiffening monomer is present in a proportion of about 16% to about 41% by mole percentage and wherein the softening monomer is present in a proportion of about 23% to about 52% by mole percentage.

Wherein the cross-linking monomers include a dopamine moiety.

Wherein the cross-linking monomers are one of dopamine methacrylamide, 3,4-dihydroxyphenylalanine, and 3,4-dihydroxystyrene.

Wherein the softening monomers include a poly(ethylene glycol) moiety.

Wherein at least one of the stiffening monomers and the softening monomers includes an acrylate moiety.

Wherein at least one of the stiffening monomers and the softening monomers includes a methacrylate moiety.

Wherein the stiffening monomers are methyl methacrylate.

Wherein the softening monomers are poly(ethylene glycol) methyl ether methacrylate.

Wherein the cross-linking monomers are present in a proportion of about 10% to about 50% by mole percentage.

Wherein the cross-linking monomers are present in a proportion of about 20% to about 40% by mole percentage.

Wherein the cross-linking monomers are present in a proportion of about 28% to about 36% by mole percentage.

Wherein the plurality of cross-linking monomers and the plurality of stiffening monomers are present in proportions resulting in an elastic modulus of the heteropolymer adhesive substantially equal to the elastic modulus of at least one of the pair of substrates.

Wherein the plurality of cross-linking monomers and the plurality of stiffening monomers are present in proportions resulting in an elastic modulus of the heteropolymer adhesive less than 25× greater than the elastic modulus of at least one of the pair of substrates, and less than 25× lower than the elastic modulus of at least one of the pair of substrates.

Wherein the plurality of cross-linking monomers and the plurality of stiffening monomers are present in proportions resulting in an elastic modulus of the heteropolymer adhesive less than 10× greater than the elastic modulus of at least one of the pair of substrates, and less than 10× lower than the elastic modulus of at least one of the pair of substrates.

Wherein the plurality of cross-linking monomers and the plurality of stiffening monomers are present in proportions resulting in an elastic modulus of the heteropolymer adhesive less than 5× greater than the elastic modulus of at least one of the pair of substrates, and less than 5× lower than the elastic modulus of at least one of the pair of substrates.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. An adhesive composition comprising a heteropolymer including
    one of dopamine methacrylamide or 3,4-dihydroxyphenylalanine or 3,4-dihydroxystyrene; and
    methyl methacrylate or styrene; and poly(ethylene glycol) methyl ether methacrylate.

2. The adhesive composition of claim 1, wherein the one of dopamine methacrylamide or 3,4-dihydroxyphenylalanine or 3,4-dihydroxystyrene is present in a proportion of about 10% to about 50% by mole percentage.

3. The adhesive composition of claim 2, wherein the one of dopamine methacrylamide or 3,4-dihydroxyphenylalanine or 3,4-dihydroxystyrene is present in a proportion of about 20% to about 40% by mole percentage.

4. The adhesive composition of claim 3, wherein the one of dopamine methacrylamide or 3,4-dihydroxyphenylalanine or 3,4-dihydroxystyrene is present in a proportion of about 28% to about 36% by mole percentage.

5. The adhesive composition of claim 1, wherein the heteropolymer is a terpolymer including
    one of dopamine methacrylamide or 3,4-dihydroxyphenylalanine or 3,4-dihydroxystyrene;
    methyl methacrylate or styrene; and
    poly(ethylene glycol) methyl ether methacrylate.

6. The adhesive composition of claim 1, wherein the heteropolymer includes dopamine methacrylamide.

7. The adhesive composition of claim 1, wherein the heteropolymer includes 3,4-dihydroxyphenylalanine.

\* \* \* \* \*